US010217536B2

United States Patent
Vilim

(10) Patent No.: US 10,217,536 B2
(45) Date of Patent: Feb. 26, 2019

(54) SYSTEM FOR THE HIGHLY AUTONOMOUS OPERATION OF A MODULAR LIQUID-METAL REACTOR WITH STEAM CYCLE

(71) Applicant: Richard B Vilim, Aurora, IL (US)

(72) Inventor: Richard B Vilim, Aurora, IL (US)

(73) Assignee: U.S. Department of Energy, Washington, DC (US)

( * ) Notice: Subject to any disclaimer, the term of this patent is extended or adjusted under 35 U.S.C. 154(b) by 1261 days.

(21) Appl. No.: 14/228,328

(22) Filed: Mar. 28, 2014

(65) Prior Publication Data

US 2019/0032519 A1 Jan. 31, 2019

Related U.S. Application Data

(60) Continuation-in-part of application No. 13/441,109, filed on Apr. 6, 2012, now abandoned, which is a division of application No. 12/499,087, filed on Jul. 8, 2009, now abandoned, which is a continuation-in-part of application No. 11/877,003, filed on Oct. 23, 2007, now abandoned, which is a
(Continued)

(51) Int. Cl.
*G21D 3/08* (2006.01)
*F01D 17/24* (2006.01)
*G21D 3/14* (2006.01)

(52) U.S. Cl.
CPC ............. *G21D 3/08* (2013.01); *F01D 17/24* (2013.01); *G21D 3/14* (2013.01)

(58) Field of Classification Search
CPC .. G21D 3/08; G21D 3/14; F01D 17/24; F01K 7/16; F01K 11/02
USPC ................................ 376/359, 241, 297, 402
See application file for complete search history.

(56) References Cited

U.S. PATENT DOCUMENTS

| 3,128,233 A | 4/1964 | Kuerzel |
| 3,275,524 A | 9/1966 | Williams |
| 3,599,424 A | 8/1971 | Yampolsky |

(Continued)

OTHER PUBLICATIONS

Sienicki et al., "Autonomous Load Following and Operational Aspects of the Star-LM HLMC Natural Convection Reactor".*
(Continued)

*Primary Examiner* — Jack W Keith
*Assistant Examiner* — Daniel Wasil
(74) *Attorney, Agent, or Firm* — Timothy L. Harney; Jacob A. Heafner; Brian J. Lally

(57) ABSTRACT

The invention relates to a nuclear plant in which the power of a nuclear reactor is controlled via demand of a connected electric grid. A naturally circulating nuclear reactor coolant loop is linked to a water/steam loop by means of a steam generator. The water/steam loop consists of an electric power generating unit and a water recirculating and steam control system. The generator is coupled to an external power grid. As power requirements of the grid change, a controller linked to the generator and a three way valve divides steam flow between the expansion turbine and a feedwater heater to boost or retard the power output. Altering the steam flow changes the pressure and temperature in the water/steam system and thus the coolant flow rate. The change in coolant flow allows the reactor core to regulate its reactivity to reach a state of equilibrium to the demand for electric power.

4 Claims, 2 Drawing Sheets

Related U.S. Application Data continuation of application No. 11/094,304, filed on Mar. 31, 2005, now abandoned.

(56) References Cited

U.S. PATENT DOCUMENTS

| | | | | |
|---|---|---|---|---|
| 3,693,347 | A | | 9/1972 | Kydd |
| 3,943,210 | A | | 3/1976 | Vetrano |
| 4,005,581 | A | * | 2/1977 | Aanstad ................ F01D 17/24 60/660 |
| 4,059,960 | A | * | 11/1977 | Osborne ................ F01D 21/20 60/646 |
| 4,087,985 | A | * | 5/1978 | Cohen ..................... F01K 3/004 376/214 |
| 4,424,186 | A | | 1/1984 | Cook |
| 4,748,814 | A | * | 6/1988 | Tanji ........................ G21D 3/12 376/216 |
| 4,879,087 | A | | 11/1989 | Akiyama |
| 6,021,169 | A | | 2/2000 | Robertson |
| 6,198,786 | B1 | * | 3/2001 | Carroll .................... G21D 3/14 376/216 |
| 2008/0144762 | A1 | * | 6/2008 | Holden ................... C22C 16/00 376/416 |

OTHER PUBLICATIONS

Sienicki, James J., Petkov, Plamen V., "Autonomous Load Following and Operational Aspects of the Star-LM HLMC Natural Convection Reactor," ICONE 10-22291.

* cited by examiner

SYSTEM FOR THE HIGHLY AUTONOMOUS OPERATION OF A MODULAR LIQUID-METAL REACTOR WITH STEAM CYCLE

CROSS REFERENCE TO RELATED APPLICATIONS

This application is continuation-in-part and claims priority from U.S. application Ser. No. 13/441,109 filed Apr. 6, 2012, which is a divisional of U.S. application Ser. No. 12/449,087 filed on Jul. 8, 2009 (abandoned), which is a continuation-in-part from U.S. application Ser. No. 11/877,003 filed on Oct. 23, 2007 (abandoned), which is a continuation of U.S. application Ser. No. 11/094,304 filed Mar. 31, 2005 (abandoned). These applications are incorporated by reference.

GOVERNMENT INTERESTS

The United States Government has rights in this invention pursuant to Contract No. W-31-109-ENG-38 between the U.S. Department of Energy and the University of Chicago.

FIELD OF THE INVENTION

The present invention relates to autonomous or nearly autonomous liquid-metal-cooled fast reactors for underdeveloped countries or for remote locations where the skilled labor pool is small.

BACKGROUND OF THE INVENTION

The lead-cooled fast reactor is one of six Generation IV nuclear systems selected by the Department of Energy for development. Design features that provide for near autonomous operation of the reactor also enhance safety and reduce costs, both Gen-IV goals. This invention relates to control and safety systems for near autonomous operation which exploit inherent feedback mechanisms to regulate power during both load change and upsets so that temperatures remain within safe limits with minimal need for active control system action. By way of definition, increasing autonomy is marked by a decreasing number of actuators and a migration of these actuators toward the balance of plant.

The reactor design studied in this work originally appeared as the Secure Transportable and Autonomous Reactor-Liquid Metal (STAR-LM) concept proposed under the Nuclear Energy Research Initiative (NERI). The plant equipment is described in B. W. Spencer, "An Advanced Modular HLMC Reactor Concept Featuring Economy, Safety, and Proliferation Resistance," Proceedings of the 8th International Conference on Nuclear Engineering, Apr. 2-6, 2000, Baltimore, Md. The primary features are a natural circulating primary system and an ultra-long life reactor core. The core lattice has a large coolant fraction resulting in a low pressure drop which enhances natural circulation. A combination of reduced power density and internal conversion allow for a core life of 10-15 years. These and other objects, aspects, and advantages of the present disclosure will become better understood with reference to the accompanying description and claims.

SUMMARY

An object of the present invention is to provide a highly autonomous modular nuclear plant in which the power of the nuclear reactor is controlled by the demand of the electric grid to which it is connected. The present invention provides a source of reliable nuclear generated electricity for underdeveloped countries or for remote locations where the skilled labor pool is small.

Another object of the present invention is to provide a nuclear reactor coupled to a naturally circulating coolant loop. This is linked to a water/steam loop by means of a steam generating system. The water/steam loop consists of the steam generator, an electric power generating unit, together with a steam/water recirculating and steam control system. The electric power generator is coupled to supply power to a sink. Such exemplary sinks are an isolated external electric grid, an electric grid with multiple power suppliers, and one or more users of the power. As the power requirements of the sink change, a controller linked to a three way valve either increases or decreases the steam flow to the expansion turbine to boost or retard the power output. The three way valve is also in communication with a feedwater heater. This steam routing changes the pressure and temperature in the water/steam system which through the steam generator alters the flow rate and temperature of the coolant through the reactor coolant loop. The change in coolant flow alters the cooling of the reactor core which responds by increasing or decreasing its power output to restore a state of equilibrium to the nuclear power plant.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE EMBODIMENTS

The invention is directed to a system for regulating nuclear reactor core reactivity. The nuclear reactor contains a nuclear reactor core as the source of thermal energy. The reactor core is the portion of the nuclear reactor containing the nuclear fuel components where the nuclear reactions take place generating fuel power. In a preferred embodiment, the core is nitride fueled. The nuclear core of the present invention has a negative temperature reactivity coefficient. A negative temperature reactivity coefficient relates to the nuclear core such that as the temperature of the nuclear core increases, the reactivity hence fuel power of the core decreases. The negative temperature reactivity coefficient characteristic is advantageous in that core reactivity establishes a reactivity and thermal equilibrium dependent upon coolant temperature and rate of flow through the coolant loop. Consequently, as the coolant temperature at an coolant inlet into the reactor drops and/or rate of coolant flow to the core increases, the core temperature decreases causing an increase in core reactivity and fuel power. Inversely, as coolant temperature increases and/or rate of coolant flow to the core decreases, the core reactivity and fuel power decreases.

Figure 1:
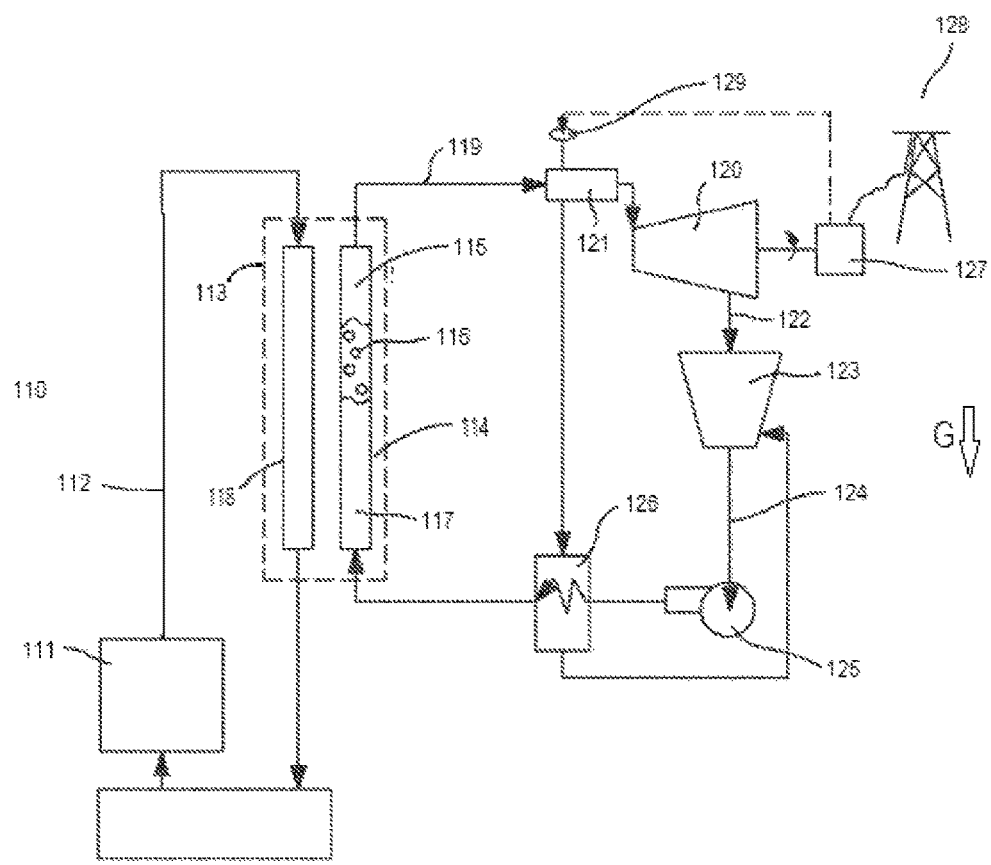
FIG. 1 is a schematic representation of an autonomous reactor of the present invention shown with interconnection to an electric grid.

Accordingly, the invention comprises a naturally circulating nuclear reactor. Natural circulation relates to the ability of the core's coolant to cycle through the coolant loop unrestricted. In a preferred embodiment, the coolant is a liquid metal. In a more preferred embodiment, the coolant is a lead alloy. Most preferentially, the coolant is a lead bismuth eutectic. The coolant loop is unrestricted in that there are no physical pumps positioned or employed in the coolant loop to provide for or assist in the flow circulation. Instead, flow circulation is a function of removal of heat and the resulting coolant density change in the core coolant. The difference in density in the coolant establishes a thermal driving head which drives the coolant through the coolant loop as the relatively warm, less dense, coolant rises and the relatively cool, more dense, coolant drops. Necessarily, the coolant loop requires a reactor core to act as a heat source to heat the coolant and a steam generator as a heat sink to cool the coolant, where the heat sink is positioned above the heat source. As is illustrated in FIG. 1, the steam generator 113 is above the nuclear reactor core 111 in that the steam generator 113 is displaced relative to the nuclear reactor core 111 at a vector positive to a direction parallel to a gravity vector. In practice, reactivity in the fuel heats the core, which in turn heats the coolant. The heated and less dense coolant exits the reactor via a nuclear reactor coolant outlet. When the coolant flows through the coolant loop, the heat exchange from the coolant to the water/steam within the thermally coupled steam generator causes the coolant temperature to fall and density to rise. The relatively cool and dense coolant then drops through the coolant loop via gravity until it returns to reenter the reactor at the nuclear reactor coolant inlet which is positioned lower than the nuclear reactor coolant outlet. The cycle then repeats as the coolant is reheated.

As stated above, the coolant loop is in thermal communication with a steam generator. Fundamentally the steam generator is a heat exchanger to transfer heat from the coolant loop to the steam/water piping system. The steam generator has a saturated liquid space and a steam space. At the interface of the saturated liquid space and steam space is an area which may be thought of as two phase region where the liquid in the saturated liquid space transitions to steam. The most significant heat transfer occurs in the two-phase region so the larger the two-phase region the greater the heat transfer between the coolant and the water/steam system. In operation, the steam generator is in fluid communication with a feedwater header and a steam piping system. Liquid enters the steam generator from the feedwater header, transitions to steam, and then exits the steam generator through the steam piping system.

The steam generated in the steam generator exits the steam generator into the steam piping system. The steam piping system is in fluid communication with a three way valve at a three way valve inlet port. The three way valve may be any flow splitter type valve known in the art. As such, the three way valve has a three way valve first outlet and a three way valve second outlet. The three way valve is engineered in such a way that the steam entering the inlet port is divided between the first outlet and second outlet. The division of steam flow is directed by the three way valve such that the valve increases steam flow through the first outlet while concomitantly decreasing steam flow to the second outlet. Conversely, the three way valve can divide the steam such that steam flow to the first outlet is decreased with a concomitant increase in steam flow to the second outlet.

An expansion turbine is in fluid communication with the three way valve at the three way valve first outlet port. Steam flow from the steam generator is controlled by the three way valve and enters the expansion turbine at a desired flow rate where it expands as required to perform work.

The expansion turbine is also in fluid communication with a condenser. Once steam enters the expansion turbine and expands to do work, it continues to flow to the condenser. The condenser operates to remove heat from the steam after exiting the expansion turbine. Once heat is removed from the steam the steam condenses to water.

A feedwater pump having a pump inlet is in fluid communication via a pump header with the condenser at the pump inlet. Water produced from steam in the condenser flows through the pump header to the feedwater pump, where it is accelerated then discharged through a pump discharge. In one embodiment, the pump is a constant speed pump. In a preferred embodiment, the pump is a centrifugal pump.

A feedwater header is in fluid communication with the feedwater pump at the pump discharge. The feedwater header is also in fluid communication with the saturated liquid space of the steam generator. Water discharged by the feedwater pump is carried through the feedwater header to the steam generator to complete a water/steam circuit.

A feedwater heater is in fluid communication at a heater inlet with the three way valve second outlet. Steam flow from the steam generator not directed to the expansion turbine is directed by three way valve to enter the feedwater heater at a desired steam flow rate. The feedwater is then in thermal communication with the feedwater header. Fundamentally the feedwater heater is a heat exchanger to transfer heat from the steam carried by the feedwater heater to the liquid in the feedwater header. The feedwater heater is then in fluid communication with the condenser at a heater outlet such that fluid exiting the feedwater heater enters the condenser where excess heat may be removed and the fluid is added back to the steam/water cycle. In an alternative embodiment, the feedwater heater is in fluid communication with the water/steam loop downstream of the condenser, such that fluid exiting the feedwater heater may be instead mixed directly with water forwarded to the steam generator rather than entering the condenser. Within this alternative embodiment, the fluid exiting the feedwater heater may enter into the water/steam loop in a fluid connection to the pump header or a fluid connection to the feedwater header.

An electric generator is mechanically driven by the expansion turbine and is electrically connected to an electric-energy sink such as an electrical grid, such that mechanical energy produced by the expansion turbine is converted by the electric generator to electric energy to supply the sink.

A controller is in data communication with the electric generator and the three way valve. The controller is programmed to respond to power drawn electric generator by directing the three way valve to increase or decrease steam shunted between the expansion turbine and the feedwater heater. The controller may function through several means known in the art. In one embodiment, an increase in electrical demand from the sink causes an increase in the electric power extracted from the generator.

The controller senses the increase in electric power drawn from the generator and an error signal is form as the difference between the current demanded from the generator and the generator output. The error signal is sent to a feedback mechanism such as a proportional-integral controller which adjusts the three way valve in a way that increases steam flow to the turbine such that an increase in turbine power is realized to equalize the current demand from the sink and the current produced by the generator. In another embodiment, the controller senses a drop in voltage supplied from the generator as demand from the sink increases. An error signal is formed as the difference between the actual voltage generated and a desired value. The error signal is then sent to a proportional-integral controller which adjusts the three way valve in a way that increases steam flow to the turbine such that an increase in turbine power is realized for the generator to match the voltage output of the generator to the desired value. In another embodiment, the controller senses a drop in frequency when there is a decrease in generator rotational speed caused by an increase in mechanical load on the generator as more power is demanded from the sink. An error signal is formed as the difference between the actual frequency supplied by the generator and a predetermined frequency, for example 60 Hz. In response, the error signal is sent to a proportional-integral controller which adjusts the three way valve in a way that increases steam flow to the turbine such that an increase in turbine power is realized to return the generator speed back to that required to produce 60 Hz.

The mode of operation of the invention relies on a relationship between the temperature and flowrate of the coolant flowing into the core and the core power. This relationship may be quantified in the reactivity balance where the reactivity D of the core is related to core flow rate, core inlet temperature, and externally imposed reactivity through $$D=(P-1)A+(P/W-1)B+C*T_{pc}+\delta D_{ext}$$

where P is normalized power, W is normalized reactor flowrate, $*T_{pc}$ is change in core inlet coolant temperature, $\delta D_{ext}$ is externally imposed reactivity, and A, B, C are integral reactivity feedback parameters that are measurable at the full power operating point. The values of A, B, C are such that a decrease in inlet temperature or an increase in liquid-metal flowrate increases reactivity. An increase in reactivity D increases core power.

The object is for reactor power to follow the electric grid demand in a way that maintains temperatures within limits acceptable for normal operation. This is achieved in part through a lengthening of the steam generator two phase region and an elevating of the midpoint of this region in response to an increase in steam flow to the expansion turbine. Reactor coolant inlet temperature is lowered by increased two-phase heat transfer and reactor coolant flowrate is increased by greater buoyancy induced by greater separation of the core and steam generator thermal centers. If the integral inlet temperature coefficient, C, is negative and/or if the integral feedback flow coefficient, B, is negative, then the decrease in cold leg temperature and increase in coolant flow in response to the original increase in steam power add reactivity to the core. As a result, the core power increases. Ultimately the core finds a new steady-state condition for which the power is in equilibrium with the increase in steam power. This mode of operation is termed inherent boiling zone control since the only active control actions are a change in the three way valve position that led to the steam power increase and realignment of the condenser cooling water flowrate to match the new plant power.

The natural circulation design option requires the coolant loop layout to support removal of reactor heat at normal operation with acceptable core outlet temperature. It is within the skill of the art to show that for unit core temperature rise, flowrate goes up linearly with the separation distance between steam generator and reactor thermal centers. Thus, the power that can be removed for fixed outlet temperature is proportional to the separation distance. The natural circulation design option then is limited in power to the extent the thermal separation is limited by costs or otherwise.

Additionally, the feedwater temperature and flowrate to the steam generator are made to behave in a way that matches steam generator power to turbine power. The feedwater temperature will increase with a decrease in steam power to the expansion turbine when, as the first three way valve outlet is increasingly closed, steam is bypassed to the feedwater heater. The feedwater heater raises the temperature of the liquid flowing through the feedwater header into the steam generator. Consequently, the saturated liquid space shrinks in length causing the elevation of the two phase region in the steam generator to drop and there is a resulting coolant flow rate reduction, through reduced gravity head, which lowers reactor power. The feedwater flowrate will decrease as steam pressure increases when a centrifugal pump or other constant feed pump is used to deliver the feedwater.

Referring now to FIG. 1, there is disclosed a schematic representation of a liquid-metal cooled nuclear powered electric generating system 110 powered by a nuclear reactor having a core 111. Liquid metal coolant is employed to cool the reactor core 111. The liquid metal coolant exits the core 111 through a line 112 and is transported to the steam generator 113 shown in dotted line and positioned above the reactor core. The water/steam portion 114 of the steam generator 113 is comprised of three phase regions: the steam space 115, the two-phase region 116, and the saturated liquid space 117 where the relative volume of these regions varies in relation to the heat flow from the liquid-metal side 118. The most significant heat transfer occurs in the two-phase region 116 so the larger the two-phase region the greater the heat transfer between the liquid-metal side 118 and the water side 114. Moreover, since the flow rate of the liquid-metal through the reactor is determined by the gravity head, the vertical position of the two-phase region 116 affects the flow of liquid metal through the reactor core 111 thereby controlling the heat transfer and power output.

Steam from the steam generator 113 exits the steam generator through a steam piping system 119 and a portion is directed toward the expansion turbine 120. The flow rate to the steam turbine is controlled by the three way valve 121. After the steam expands as required to perform the work in the expansion turbine 120, it exits through a line 122 to a condenser 123 where heat is removed and water exits the condenser 123 through a pump header 124 to the feedwater pump 125. The feedwater pump 125 then returns water to the steam generator 113 via a feedwater header after passing through a thermally coupled feed water heater 126. The mechanical output from the expansion turbine 120 is directed to an electric generator 127 which is in turn is connected to a sink such as the electric grid 128.

A sink such as the electric grid 128 demands power from the electric generator 127. A controller 129 linked to the three way valve 121 is able to sense the demand for increased power from the generator 127. As the demand for power from the electric grid 128 increases, the controller 129 responds by sending more steam to the expansion turbine 120 and less steam to the feedwater heater 126. This steam portioning increases the power output supplied by the generator 127 to the grid 128 and decreases the feedwater temperature as it recycles to the steam generator. In a reciprocal manner, as the power demand decreases, the controller 129 responds by altering the setting of the three way valve 121 to send less steam to the turbine 120 and shunt more steam to the feedwater heater 126. It should be noted that alteration of steam division changes the volume of the two phase region 116, ultimately leading to an increase in reactor power and a reestablishment of a reactor core equilibrium at a higher level. For the low power situation, the changes in physical parameters would be reversed leading to a decrease in the volume of the two phase region 116 of the water/steam line and subsequently a decrease in reactor power.

Figure 2:
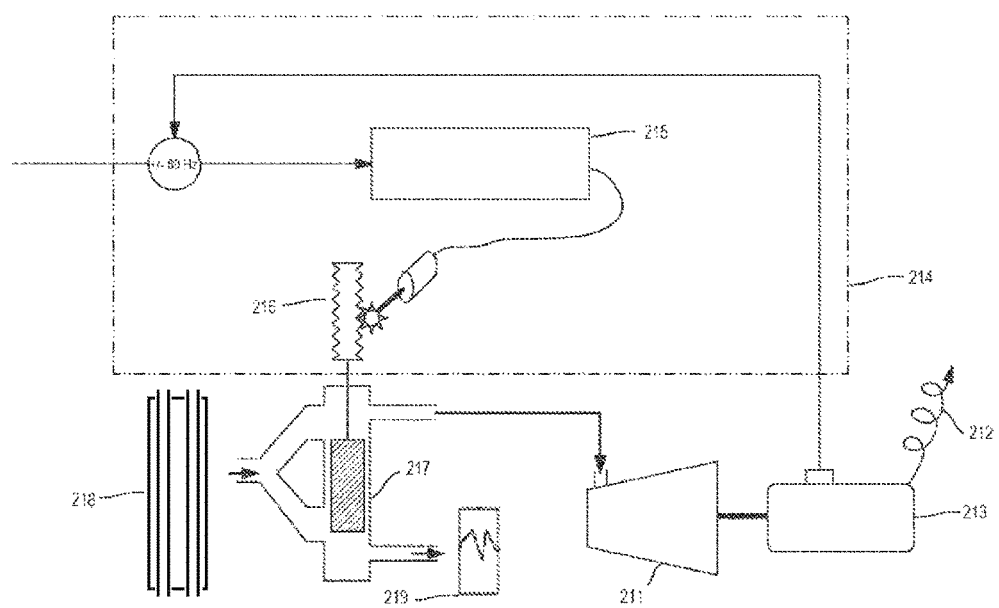
FIG. 2. shows the three way valve control system as interfaced to plant components.

Referring now to FIG. 2, a three way valve and controller function to regulate generator output in the presence demand from a sink. In the illustration, there is an increase in mechanical load on an expansion turbine 211 resulting when an electric grid 212 increases demand for electrical power from the electric generator 213. The controller unit 214 senses a drop in output frequency as generator speed drops due to the added mechanical load from the increase in demand. An error signal is formed as the difference between the actual output frequency and a desired frequency of 60 Hz. The error signal is sent to a feedback mechanism such as a proportional-integral controller 215 which moves a valve shaft 216 of a three way valve 217 in a way that concomitantly increases steam flow from a steam generator 218 to the expansion turbine 211 and decreases steam flow to a feedwater heater 219, such that an increase in turbine power is realized to return the generator speed back to that required to achieve a frequency of 60 Hz and power production from a reactor core reaches equilibrium with the demands of the electric grid 212.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

I claim:

1. A system for regulating nuclear reactor core activity comprising:
    a naturally circulating nuclear reactor having a nuclear reactor cooling outlet,
    a nuclear reactor cooling inlet, and
    a nuclear core with a negative temperature reactivity coefficient;
    a steam generator having a saturated liquid space displaced above the nuclear reactor cooling outlet, and
    a steam space;
    a coolant loop where the coolant loop cycles coolant out through the nuclear reactor coolant outlet, where the coolant loop is in thermal communication with the saturated liquid space of the steam generator, and where the coolant loop cycles coolant in through the nuclear reactor coolant inlet;
    a steam piping system in fluid communication with the steam space of the steam generator;
    a three way valve having a valve shaft, in fluid communication at a three way valve inlet port with the steam piping system which leaves the steam generator;
    an expansion turbine directly fluidly connected to and in fluid communication with the three way valve only at a three way valve first outlet port;
    a condenser in fluid communication with the expansion turbine;
    a pump header in fluid communication with the condenser;
    a feedwater heater in fluid communication at a heater inlet port with the three way valve at a three way valve second outlet port and in fluid communication at a heater outlet port with the condenser;
    a feedwater pump having a pump inlet port in fluid communication with the pump header, and
    a pump discharge port;
    a feedwater header in fluid communication with the pump discharge port of the feedwater pump, in thermal communication with the feedwater heater, and in fluid communication with the saturated liquid space of the steam generator;
    an electric generator mechanically driven by the expansion turbine and electrically connected to an electrical grid; and
    a controller separate from and in data communication with both the valve shaft of the three way valve and the electric generator, where the controller is programmed to
        respond to an increase in power demand from the electric generator by directing movement of the valve shaft to concomitantly increase steam flow to the expansion turbine and decrease steam flow to the feedwater heater, and
        respond to a decrease in power demand from the electric generator by directing movement of the valve shaft to concomitantly decrease steam flow to the expansion turbine and increase steam flow to the feedwater heater.

2. The electric generating system of claim 1 where the nuclear reactor includes fuel, and where the fuel is a nitride.

3. The electric generating system of claim 2 where the coolant includes lead.

4. The electric generating system of claim 3, where the coolant is a lead-bismuth eutectic.

* * * * *